US011750800B1

(12) United States Patent
Zeng et al.

(10) Patent No.: US 11,750,800 B1
(45) Date of Patent: Sep. 5, 2023

(54) ENCODER AND ASSOCIATED SIGNAL PROCESSING METHOD

(71) Applicant: Realtek Semiconductor Corp., HsinChu (TW)

(72) Inventors: Weimin Zeng, Milpitas, CA (US); Chi-Wang Chai, Cupertino, CA (US); Wei Pu, Suzhou (CN); Wujun Chen, Suzhou (CN); Jing Wang, Suzhou (CN); Wei Li, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/828,013

(22) Filed: May 30, 2022

(51) Int. Cl.
*H04N 19/105* (2014.01)
*H04N 19/176* (2014.01)
*H04N 19/159* (2014.01)
*H04N 19/119* (2014.01)

(52) U.S. Cl.
CPC ......... *H04N 19/105* (2014.11); *H04N 19/119* (2014.11); *H04N 19/159* (2014.11); *H04N 19/176* (2014.11)

(58) Field of Classification Search
CPC .. H04N 19/105; H04N 19/119; H04N 19/159; H04N 19/176
See application file for complete search history.

(56) References Cited

U.S. PATENT DOCUMENTS 11,582,443 B1 * 2/2023 Chaudhari ........... H04N 19/146

FOREIGN PATENT DOCUMENTS

CN 111586410 A 8/2020
TW 201803349 A 1/2018

OTHER PUBLICATIONS

Han et al., A Technical Overview of AV1, Feb. 8, 2021, p. 1-25, arXiv, USA.
Jingning Han et al., A Technical Overview of AV1, Digital Object Identifier: 10.1109/JPROC.2021.3058584, Proceedings of the IEEE, vol. 109, Issue 9, Sep. 2021, p. 1~28, Sep. 2021.

* cited by examiner

*Primary Examiner* — Nam D Pham
(74) *Attorney, Agent, or Firm* — Winston Hsu

(57) ABSTRACT

A prediction circuit in an encoder utilizes a specific partition mode to process a super block for generating a plurality of reconstructed pixel values for each block in the super block, and the reconstructed pixel values of each block are directly utilized as reference pixels for other blocks to perform intra-frame prediction, so as to improve the efficiency of the encoder.

17 Claims, 4 Drawing Sheets

ENCODER AND ASSOCIATED SIGNAL PROCESSING METHOD

BACKGROUND OF THE INVENTION

1. Field of the Invention

The present invention is related to video processing, and more particularly, to an encoder and an associated signal processing method.

2. Description of the Prior Art

In Alliance for Open Media (AOMedia) Video 1 (AV1) video encoding format formulated by AOMedia, multiple coding units with different sizes are formulated, wherein a coding unit with the maximum size is regarded as a super block, and the maximum size may be 128*128 pixels or 64*64 pixels. In addition, the super block may be further partitioned into multiple smaller coding units (or blocks), and a size of each block partitioned in the super block may be one of 16*16 pixels, 16*8 pixels, 8*16 pixels, 16*4, 4*16 pixels, 8*8 pixels, etc. In AV1 specification, for each super block, the encoder will try all partition manners, to determine the best coding scheme. In detail, for each partition manner of each super block, the encoder needs to perform prediction, transform, quantization, inverse quantization, inverse transform, pixel value reconstruction, etc., to obtain reconstructed pixel values for the currently selected block size. After the best partition manner of the super block is determined, reconstructed pixel values that are generated under the best partition manner act as reference pixels that are utilized by intra prediction of subsequent adjacent blocks. However, since each super block will be partitioned into multiple blocks with different sizes, the encoder needs to perform the pixel value reconstruction multiple times, which results in long encoding time and low encoding efficiency.

SUMMARY OF THE INVENTION

It is therefore one of the objectives of the present invention to provide an encoder and an associated signal processing method, to address the above-mentioned problems.

According to an embodiment of the present invention, an encoder is provided. The encoder may include a prediction circuit, and the prediction circuit may include a specific partition mode processing circuit and a best partition mode determining and processing circuit. The specific partition mode processing circuit may be arranged to partition a super block of a frame into multiple specific blocks according to a specific partition mode, and perform intra-frame prediction upon each of the multiple specific blocks, to generate a specific prediction data, wherein the specific prediction data of said each of the multiple specific blocks is arranged to generate multiple first reconstruct pixel values of said each of the multiple specific blocks. After the specific partition mode processing circuit generates the multiple first reconstruct pixel values of said each of the multiple specific blocks under the specific partition mode, the best partition mode determining and processing circuit is arranged to utilize multiple partition modes that are different from the specific partition mode to partition the super block into multiple blocks, respectively, to generate a plurality of groups of prediction data, and determine a best partition mode according to the plurality of groups of prediction data. For one of the multiple specific blocks, the specific partition mode processing circuit directly utilizes multiple first reconstruct pixel values corresponding to an adjacent specific block of said one of the multiple specific blocks to act as multiple reference pixels, for performing intra-frame prediction upon said one of the multiple specific blocks to generate the specific prediction data.

According to an embodiment of the present invention, a signal processing method applicable to an encoder is provided. The signal processing method may include: partitioning a super block of a frame into multiple specific blocks according to a specific partition mode, and performing intra-frame prediction upon each of the multiple specific blocks, to generate a specific prediction data; according to the specific prediction data of each of the multiple specific blocks, generating multiple first reconstruct pixel values of said each of the multiple specific blocks; and after the multiple first reconstruct pixel values of said each of the multiple specific blocks are generated under the specific partition mode, utilizing multiple partition modes that are different from the specific partition mode to partition the super block into multiple blocks, respectively, to generate a plurality of groups of prediction data, and determining a best partition mode accordingly; wherein performing intra-frame prediction upon said each of the multiple specific blocks, to generate the specific prediction data comprises: for one of the multiple specific blocks, directly utilizing multiple first reconstruct pixel values corresponding to an adjacent specific block of said one of the multiple specific blocks to act as multiple reference pixels, for performing intra-frame prediction upon said one of the multiple specific blocks to generate the specific prediction data.

One of the benefits of the present invention is that, in the encoder of the present invention and the associated signal processing method, by utilizing the specific partition mode to generate the reconstructed pixel value in priority in the prediction circuit for performing intra-frame prediction upon other blocks, the disadvantage of the prior art that it has to wait for the surrounding blocks to complete the best partition mode determination before performing the intra-frame prediction can be avoided, so that the waiting time of the hardware can be reduced. In addition, regarding each block, the encoder of the present invention only needs to perform transform, quantization, inverse quantization, and pixel value reconstruction one or two times, without performing the pixel value reconstruction for each partition mode, which can improve the efficiency of the encoder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
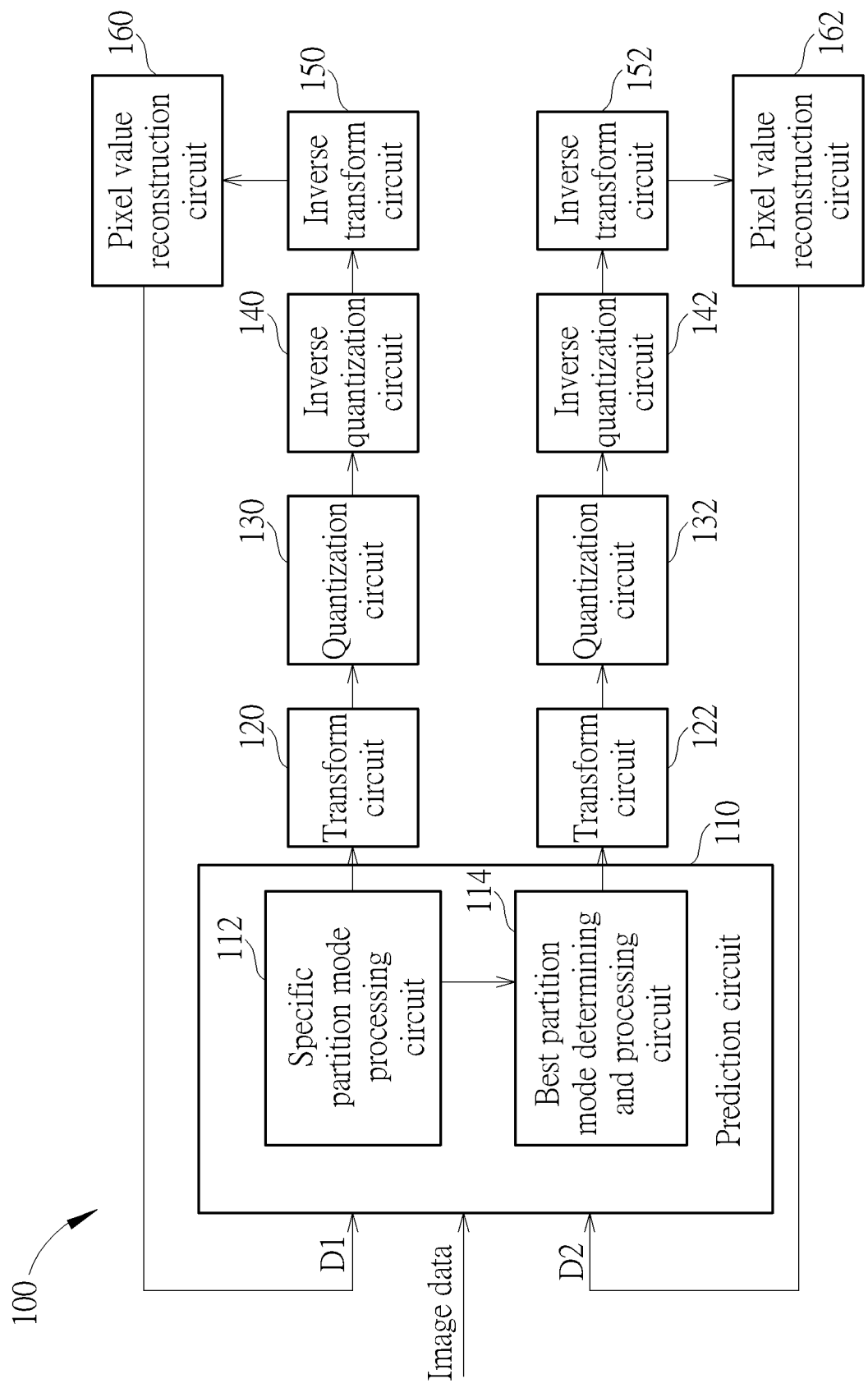
FIG. 1 is a diagram illustrating an encoder according to an embodiment of the present invention.

FIG. 1 is a diagram illustrating an encoder 100 according to an embodiment of the present invention. As shown in FIG. 1, the encoder 100 may include a prediction circuit 110, a transform circuit 120, a quantization circuit 130, an inverse quantization circuit 140, an inverse transform circuit 150, and a pixel value reconstruction circuit 160, and the encoder 100 may further include a transform circuit 122, a quantization circuit 132, an inverse quantization circuit 142, an inverse transform circuit 152, and a pixel value reconstruction circuit 162, wherein the prediction circuit 110 may include a specific partition mode processing circuit 112 and a best partition mode determining and processing circuit 114. In this embodiment, the encoder 100 supports AOMedia Video 1 (AV1) video encoding format formulated by AOMedia.

In the main operations of the encoder 100, the prediction circuit 110 may be arranged to receive external image data (e.g., an image frame) and an interpolated frame or predicted image data generated inside the encoder 100, to generate predicted image data and residual data. Specifically, the prediction circuit 110 may partition the received frame into multiple super blocks (i.e., multiple largest coding units), and then each super block is partitioned into multiple blocks (i.e., multiple coding units), and perform inter-frame prediction, intra-frame prediction, motion estimation, and/or motion compensation upon the multiple blocks, to generate the predicted image data and multiple residual data that correspond to the multiple blocks, respectively. In addition, in the process of intra-frame prediction, each block will need to utilize pixel values of surrounding blocks to act as reference pixel values. For example, it is needed to utilize a part of reconstructed pixel values of the upper block and the left block to act as the reference pixel values, for performing the intra-frame prediction. For an encoder mentioned in the prior art, after the best partition manner of the super block is determined (e.g., the size of each block may be 16*16 pixels, 16*8 pixels, 8*16 pixels, 16*4 pixels, or 8*8 pixels), reconstructed pixel values that are generated under the best partition manner act as reference pixel values that are utilized by intra-frame prediction of subsequent adjacent blocks, which results in long encoding time and low encoding efficiency.

In this embodiment, in order to address the above-mentioned problem, the prediction circuit 110 provides the specific partition mode processing circuit 112 that directly utilizes reconstructed pixel values generated by a certain partition mode to act as the reference pixel values utilized by intra-frame prediction of adjacent blocks, and provides the best partition mode determining and processing circuit 114 that synchronously determines the best partition mode for subsequent encoding. In this way, the encoding time can be reduced greatly.

It should be noted that, since a skilled person may refer to the paper "A Technical Overview of AV1" by Jingning Han et al. for details of the associated encoding operation, pixel value reconstruction, multiple partition manners of the super block, and the intra-frame prediction, and the focus of the present invention is on the super block partition manner of the encoder 100 when performing the intra-frame prediction and the reconstructed pixel values utilized by each block, the following description only illustrates the relevant contents.

In detail, in the process of intra-frame prediction, it is assumed that what is actually divided is a block with 32*32 pixel values. Therefore, the super block with 32*32 pixel values is taken as an example for following description. In the operation of the specific partition mode processing circuit 112, in the beginning, the specific partition mode processing circuit 112 directly utilizes a specific partition mode to partition the super block (e.g., utilizes an 8*8 mode to partition the super block into 16 specific blocks each having the size of 8*8 pixel values), and performs the intra-frame prediction.

Figure 2:
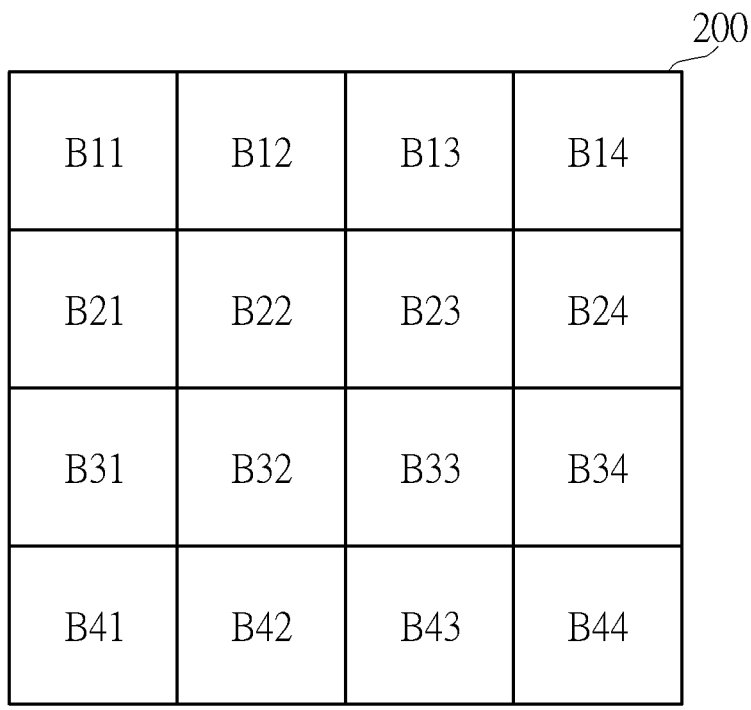
FIG. 2 is a diagram illustrating multiple blocks that are generated by utilizing the specific partition mode to perform partition upon the super block according to an embodiment of the present invention.

Please refer to FIG. 2. FIG. 2 is a diagram illustrating multiple blocks that are generated by utilizing the specific partition mode to perform partition upon the super block according to an embodiment of the present invention. As shown in FIG. 2, a super block 200 is partitioned into 16 specific blocks B11-B44, wherein the size of each of the specific blocks B11-B44 is 8*8 pixel values. It is assumed that the specific block B11 has already completed the intra-frame prediction. The specific partition mode processing circuit 112 may transmit specific prediction data (which may include the predicted image data or the residual data) of the specific block B11 to the transform circuit 120, and the transform circuit 120 may perform discrete cosine transform (DCT) upon the specific prediction data, to transform the specific prediction data into frequency-domain data. Afterwards, the quantization circuit 130 may perform quantization upon the frequency-domain data generated by the transform circuit 120, to generate quantized data. The inverse quantization circuit 140 may perform inverse quantization upon the quantized data. The inverse transform circuit 150 may perform inverse transform (e.g., inverse DCT) upon an output of the inverse quantization circuit 140, to generate an inverse transformed prediction data. Next, the pixel value reconstruction circuit 160 may generate and transmit reconstructed pixel values Dl of the specific block B11 to the prediction circuit 110 according to the inverse transformed prediction data.

It is assumed that the specific blocks B12, B13, B14, and B21 generate corresponding reconstructed pixel values Dl through the same process as mentioned above. In the process of the specific partition mode processing circuit 112 operating upon the specific block B22, the specific partition mode processing circuit 112 may directly utilize the reconstructed pixel values Dl of the adjacent specific block B12 and the reconstructed pixel values Dl of the adjacent specific block B21 to act as the reference pixel values, for performing the intra-frame prediction to generate corresponding specific prediction data. The quantization circuit 130, the inverse quantization circuit 140, the inverse transform circuit 150, and the pixel value reconstruction circuit 160 may process the specific prediction data of the specific block B22 to generate the reconstructed pixel values Dl of the specific block B22, to act as the reference pixel values of the subsequent blocks (e.g., blocks B23, B32, and B33) for performing the intra-frame prediction.

As mentioned in the above embodiments, since the reference pixel values used by intra-frame prediction of most of the blocks in the super block 200 may be generated under a condition that the super block 200 utilizes the specific partition mode (e.g., the 8*8 mode), after the best partition mode of the super block 200 is determined, there is no need to utilize the reconstructed pixel values generated under the best partition mode of the super block 200 to act as the reference pixel values, so that the prediction circuit of the present invention can perform the intra-frame prediction upon the blocks quickly.

Figure 3:
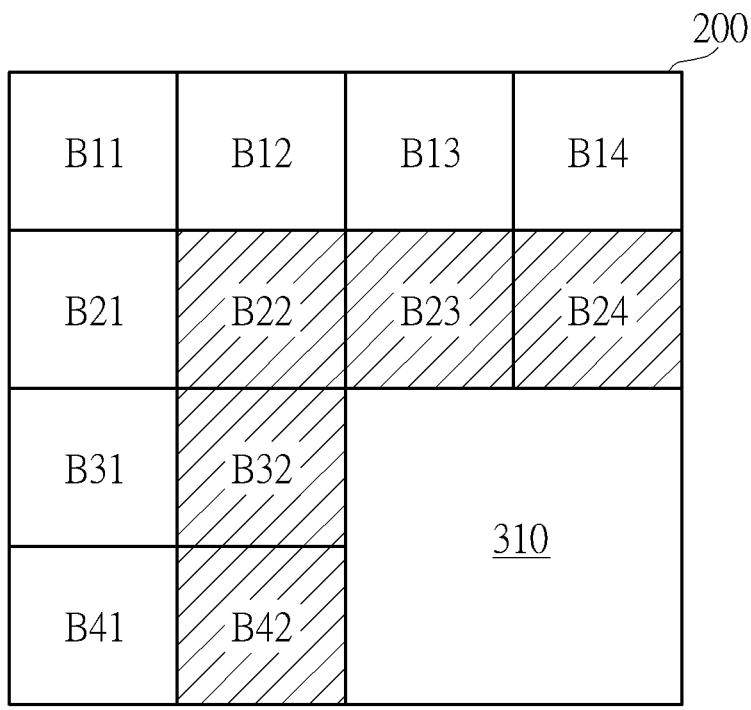
FIG. 3 is a diagram illustrating intra-frame prediction of blocks with other sizes that is performed by utilizing the reconstructed pixel values generated by the specific partition mode according to an embodiment of the present invention.

In addition, after the super block 200 utilizes the specific partition mode to generate the prediction data and the reconstructed pixel values, the best partition mode determining and processing circuit 144 may perform other partition modes (e.g., 16*16 mode, 16*8 mode, 8*16 mode, 16*4 mode, or 4*16 mode) to generate corresponding prediction data, wherein in the process of performing other partition modes, the reconstructed pixel values generated by utilizing the specific partition mode can act as the reference pixel values. Specifically, refer to FIG. 3. FIG. 3 is a diagram illustrating intra-frame prediction of blocks with other sizes that is performed by utilizing the reconstructed pixel values generated by the specific partition mode according to an embodiment of the present invention. It is assumed that the super block 200 is partitioned by the 16*16 mode, and the intra-frame prediction performed upon a block 310 shown in FIG. 3 can utilize the reconstructed pixel values D1 of the specific blocks B22, B23, B24, B32, and B42 that are previously generated under the 8×8 mode (i.e., specific partition mode), to generate prediction data of the block 310.

By calculating the prediction data of the super block 200 under each partition mode, the best partition mode determining and processing circuit 114 may compare the prediction data of all partition modes (e.g., comparing the residual data of all partition modes), to determine a best partition mode of the super block 200. Afterwards, the best partition mode determining and processing circuit 114 may transmit the prediction data that is generated by performing the intra-frame prediction upon the super block 200 under the best partition mode to the transform circuit 122, and the transform circuit 122 may perform DCT upon the prediction data, to transform the prediction data into the frequency-domain data. The quantization circuit 132 may perform quantization upon the frequency-domain data generated by the transform circuit 122, to generate a quantized data. The inverse quantization circuit 142 may perform inverse quantization upon the quantized data generated by the quantization circuit 132, and the inverse transform circuit 152 may perform inverse transform (e.g., inverse DCT) upon an output of the inverse quantization circuit 142, to generate an inverse transformed prediction data. The pixel value reconstruction circuit 162 may generate and transmit reconstructed pixel values D2 of each block of the super block 200 under the best partition mode to the prediction circuit 110.

In addition, the quantization parameter generated by the quantization circuit 132 may be transmitted to a back-end encoding circuit (not shown), and the reconstructed pixel values D2 may also be transmitted to the encoding circuit through a loop filter (not shown), for generation of an encoded data.

As mentioned above, the prediction circuit 110 of the present invention can first generate the reconstructed pixel values of each block through the specific partition mode processing circuit 112, for later use in subsequent other blocks under the specific partition mode or blocks under other partition modes, which improves the efficiency of the prediction circuit 110 and facilitates parallel processing. In addition, in this embodiment, the encoder 100 can only need to perform transform, quantization, inverse quantization, inverse transform, and pixel value reconstruction one or two times, so that consumption of the hardware resource can be reduced. Specifically, if the best partition mode of the super block 200 is different from the specific partition mode, the encoder 100 needs to perform transform, quantization, inverse quantization, inverse transform, and pixel value reconstruction once for any of the best partition mode and the specific partition mode of the super block 200, and the remaining partition modes have no need to perform the above-mentioned transform, quantization, inverse quantization, inverse transform, and pixel value reconstruction. If the best partition mode of the super block 200 is the specific partition mode, the encoder 100 needs to perform transform, quantization, inverse quantization, inverse transform, and pixel value reconstruction for the super block 200 only once. That is, the reconstructed pixel values D1 generated by the specific partition mode processing circuit 112 can directly act as the reconstructed pixel values D2 of the best partition mode determining and processing circuit 114.

Figure 4:
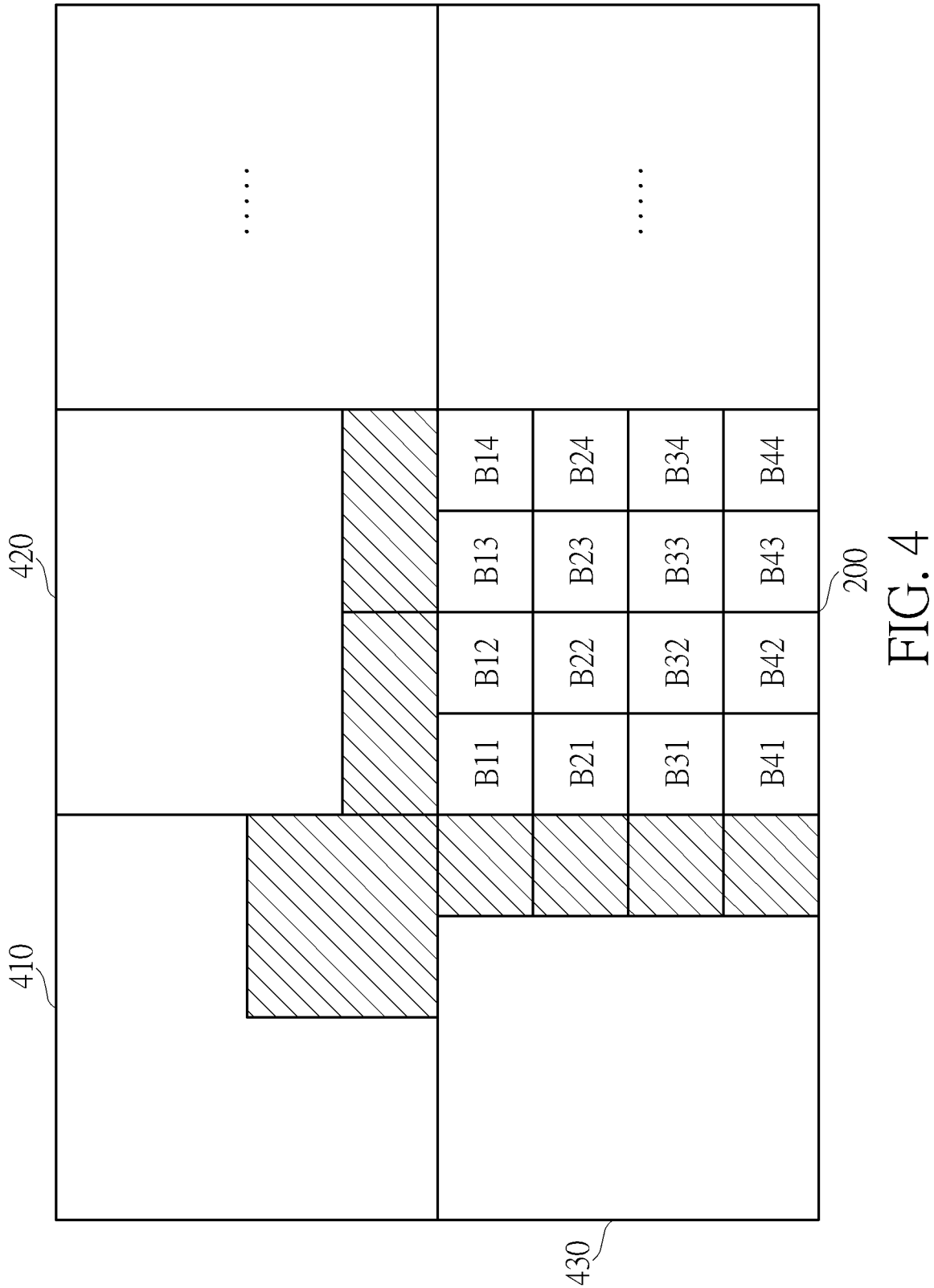
FIG. 4 is a diagram illustrating intra-frame prediction that is performed by utilizing the reconstructed pixel values generated by the adjacent super blocks in the best partition modes according to an embodiment of the present invention.

In addition, in other embodiments, if the best partition modes and corresponding reconstructed pixel of adjacent super blocks of the super block 200 have already been determined, the specific partition mode processing circuit 112 or the best partition mode determining and processing circuit 114 may first utilize the reconstructed pixel values of the adjacent super blocks that are generated under the best partition modes when performing the intra-frame prediction upon the super block 200. Specifically, refer to FIG. 4. FIG. 4 is a diagram illustrating intra-frame prediction that is performed by utilizing the reconstructed pixel values generated by the adjacent super blocks in the best partition modes according to an embodiment of the present invention. When the specific partition mode processing circuit 112 performs the intra-frame prediction upon the specific block B11 of the super block 200, it is assumed that the upper adjacent super blocks 410 and 420 have already determined the best partition modes (e.g., the best partition mode of the adjacent super block 410 is 16*16, and the best partition mode of the adjacent super block 420 is 8*16) and have already generated corresponding reconstructed pixel values, but the left adjacent super block 430 has not determined the best partition mode yet. The specific partition mode processing circuit 112 can utilize the reconstructed pixel values generated by the adjacent super blocks 410 and 420 under the best partition modes and the reconstructed pixel value generated by the adjacent super block 430 under the specific partition mode to perform the intra-frame prediction upon the specific block B11.

Figure 5:
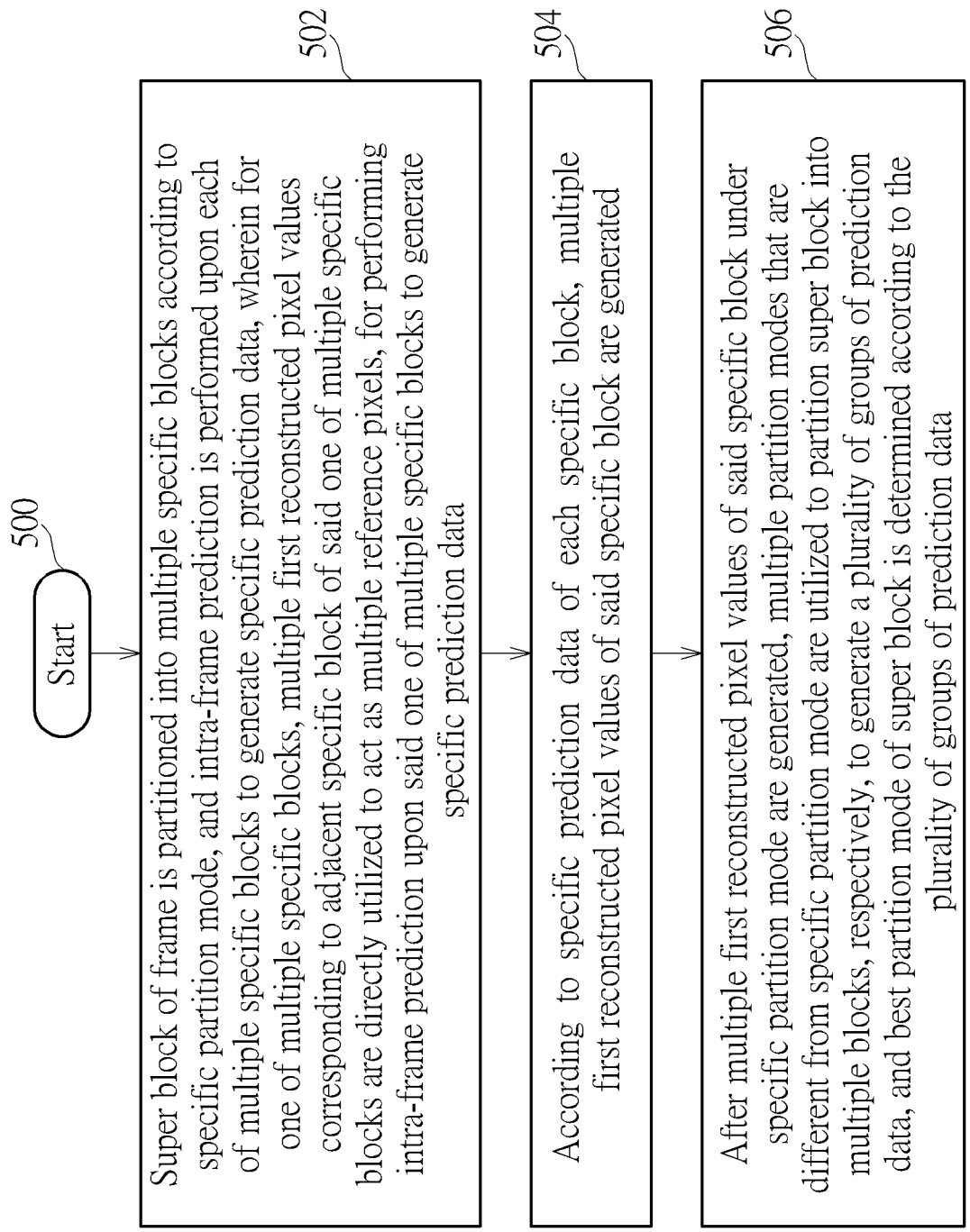
FIG. 5 is a flowchart of a signal processing method applicable to an encoder according to an embodiment of the present invention.

FIG. 5 is a flowchart of a signal processing method applicable to an encoder according to an embodiment of the present invention. Refer to contents mentioned by the above embodiments. The flow of the signal processing method may be described as follows.

In Step 500, the flow starts.

In Step 502, a super block of a frame is partitioned into multiple specific blocks according to a specific partition mode, and intra-frame prediction is performed upon each of the multiple specific blocks to generate a specific prediction data, wherein for one of the multiple specific blocks, multiple first reconstructed pixel values corresponding to an adjacent specific block of said one of the multiple specific blocks are directly utilized to act as multiple reference pixels, for performing the intra-frame prediction upon said one of the multiple specific blocks to generate the specific prediction data.

In Step 504, according to the specific prediction data of each specific block, the multiple first reconstructed pixel values of said specific block are generated.

In Step 506, after the multiple first reconstructed pixel values of said specific block under the specific partition mode are generated, multiple partition modes that are different from the specific partition mode are utilized to partition the super block into multiple blocks, respectively, to generate a plurality of groups of prediction data, and a best partition mode of the super block is determined according to the plurality of groups of prediction data.

In summary, in the encoder of the present invention and the associated signal processing method, by first utilizing the specific partition mode to generate the reconstructed pixel values in the prediction circuit for later use in intra-frame prediction performed upon other blocks, the disadvantage of the prior art that it has to wait for the surrounding blocks to complete the best partition mode determination before performing the intra-frame prediction can be avoided, so that the waiting time of the hardware can be reduced. In addition, regarding each block, the encoder of the present invention only needs to perform transform, quantization, inverse quantization, and pixel value reconstruction one or two times, without performing the pixel value reconstruction for each partition mode, which can improve the efficiency of the encoder.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoder, comprising:
    a prediction circuit, comprising:
        a specific partition mode processing circuit, arranged to partition a super block of a frame into multiple specific blocks according to a specific partition mode, and perform intra-frame prediction upon each of the multiple specific blocks, to generate a specific prediction data, wherein the specific prediction data of said each of the multiple specific blocks is arranged to generate multiple first reconstruct pixel values of said each of the multiple specific blocks; and
        a best partition mode determining and processing circuit, wherein after the specific partition mode processing circuit generates the multiple first reconstruct pixel values of said each of the multiple specific blocks under the specific partition mode, the best partition mode determining and processing circuit is arranged to utilize multiple partition modes that are different from the specific partition mode to partition the super block into multiple blocks, respectively, to generate a plurality of groups of prediction data, and determine a best partition mode according to the plurality of groups of prediction data;
        wherein for one of the multiple specific blocks, the specific partition mode processing circuit directly utilizes multiple first reconstruct pixel values corresponding to an adjacent specific block of said one of the multiple specific blocks to act as multiple reference pixels, for performing intra-frame prediction upon said one of the multiple specific blocks to generate the specific prediction data.

2. The encoder of claim 1, wherein for one of the multiple blocks, the best partition mode determining and processing circuit directly utilizes multiple first reconstruct pixel values corresponding to one or more specific blocks that are adjacent to said one of the multiple blocks to act as multiple reference pixels, for performing intra-frame prediction upon said one of the multiple blocks to generate a group of prediction data.

3. The encoder of claim 1, further comprising:
    a first transform circuit, arranged to transform the specific prediction data into a first frequency-domain data;
    a first quantization circuit, arranged to perform quantization upon the first frequency-domain data, to generate a first quantized data;
    a first inverse quantization circuit, arranged to perform inverse quantization upon the first quantized data;
    a first inverse transform circuit, arranged to perform inverse transform upon an output of the first inverse quantization circuit, to generate a first inverse-transformed prediction data; and
    a first pixel value reconstruction circuit, arranged to generate the multiple first reconstructed pixel values according to the first inverse-transformed prediction data.

4. The encoder of claim 3, further comprising:
    a second transform circuit, wherein under a condition that the best partition mode determining and processing circuit utilizes the best partition mode to partition the super block into the multiple blocks, for each block, the second transform circuit is arranged to transform the prediction data corresponding to said each block into a second frequency-domain data;
    a second quantization circuit, arranged to perform quantization upon the second frequency-domain data, to generate a second quantized data;
    a second inverse quantization circuit, arranged to perform inverse quantization upon the second quantized data;
    a second inverse transform circuit, arranged to perform inverse transform upon an output of the second inverse quantization circuit, to generate a second inverse-transformed prediction data; and
    a second pixel value reconstruction circuit, arranged to generate multiple second reconstructed pixel values according to the second inverse-transformed prediction data.

5. The encoder of claim 4, wherein the frame comprises a first adjacent super block and a second adjacent super block that are adjacent to the super block, the specific partition mode processing circuit processes the first adjacent super block and the second adjacent super block according to the specific partition mode, for generating corresponding multiple first reconstructed pixel values; the best partition mode determining and processing circuit processes the first adjacent super block, for generating corresponding multiple second reconstructed pixel values; and for said one of the multiple specific blocks, the specific partition mode processing circuit utilizes the corresponding multiple first reconstructed pixel values and the corresponding multiple second reconstructed pixel values to act as the multiple reference pixels.

6. The encoder of claim 4, wherein the frame comprises a first adjacent super block and a second adjacent super block that are adjacent to the super block, the specific partition mode processing circuit processes the first adjacent super block and the second adjacent super block according to the specific partition mode, for generating corresponding multiple first reconstructed pixel values; the best partition mode determining and processing circuit processes the first adjacent super block, for generating corresponding multiple second reconstructed pixel values; and for one of the multiple blocks, the best partition mode determining and processing circuit utilizes the corresponding multiple first reconstructed pixel values and the corresponding multiple second reconstructed pixel values to act as the multiple reference pixels, to perform intra-frame prediction upon said one of the multiple blocks, to generate a group of prediction data.

7. The encoder of claim 4, wherein the second transform circuit, the second quantization circuit, the second inverse quantization circuit, the second inverse transform circuit, and the second pixel value reconstruction circuit operate only when the best partition mode is different from the specific partition mode.

8. The encoder of claim 1, wherein a size of each specific block is smaller than or equal to a size of each block in the multiple blocks.

9. The encoder of claim 1, wherein the encoder supports Alliance for Open Media (AOMedia) Video 1 (AV1) video encoding format, and a size of each specific block is 8*8 pixels.

10. The encoder of claim 1, wherein the best partition mode determining and processing circuit compares residual data of the multiple partition modes, to determine the best partition mode.

11. A signal processing method applicable to an encoder, comprising:
    partitioning a super block of a frame into multiple specific blocks according to a specific partition mode, and performing intra-frame prediction upon each of the multiple specific blocks, to generate a specific prediction data;
    according to the specific prediction data of each of the multiple specific blocks, generating multiple first reconstruct pixel values of said each of the multiple specific blocks; and
    after the multiple first reconstruct pixel values of said each of the multiple specific blocks are generated under the specific partition mode, utilizing multiple partition modes that are different from the specific partition mode to partition the super block into multiple blocks, respectively, to generate a plurality of groups of prediction data, and determining a best partition mode according to the plurality of groups of prediction data;
    wherein performing intra-frame prediction upon said each of the multiple specific blocks, to generate the specific prediction data comprises:
        for one of the multiple specific blocks, directly utilizing multiple first reconstruct pixel values corresponding to an adjacent specific block of said one of the multiple specific blocks to act as multiple reference pixels, for performing intra-frame prediction upon said one of the multiple specific blocks to generate the specific prediction data.

12. The signal processing method of claim 11, wherein utilizing the multiple partition modes that are different from the specific partition mode to partition the super block into the multiple blocks, respectively, to generate the plurality of groups of prediction data comprises:
    for one of the multiple blocks, directly utilizing multiple first reconstruct pixel values corresponding to one or more specific blocks that are adjacent to said one of the multiple blocks to act as the multiple reference pixels, for performing intra-frame prediction upon said one of the multiple blocks to generate a group of prediction data.

13. The signal processing method of claim 11, further comprising:
    transforming the specific prediction data into a first frequency-domain data;
    performing quantization upon the first frequency-domain data, to generate a first quantized data;
    performing inverse quantization upon the first quantized data, to generate a first output;
    performing inverse transform upon the first output, to generate a first inverse-transformed prediction data; and
    generating the multiple first reconstructed pixel values according to the first inverse-transformed prediction data.

14. The signal processing method of claim 13, further comprising:
    under a condition that the best partition mode is utilized to partition the super block into the multiple blocks, for each block, transforming the prediction data corresponding to said each block into a second frequency-domain data;
    performing quantization upon the second frequency-domain data, to generate a second quantized data;
    performing inverse quantization upon the second quantized data, to generate a second output;
    performing inverse transform upon the second output, to generate a second inverse-transformed prediction data; and generating the multiple second reconstructed pixel values according to the second inverse-transformed prediction data.

15. The signal processing method of claim 14, wherein the frame comprises a first adjacent super block and a second adjacent super block that are adjacent to the super block, and the signal processing method further comprises:
    processing the first adjacent super block and the second adjacent super block according to the specific partition mode, for generating corresponding multiple first reconstructed pixel values;
    processing the first adjacent super block, for determining a best partition mode of the first adjacent super block and corresponding multiple second reconstructed pixel values; and
    for said one of the multiple specific blocks, utilizing the corresponding multiple first reconstructed pixel values and the corresponding multiple second reconstructed pixel values to act as the multiple reference pixels.

16. The signal processing method of claim 14, wherein the frame comprises a first adjacent super block and a second adjacent super block that are adjacent to the super block, and the signal processing method further comprises:
    processing the first adjacent super block and the second adjacent super block according to the specific partition mode, for generating corresponding multiple first reconstructed pixel values;
    processing the first adjacent super block, for determining a best partition mode of the first adjacent super block and corresponding multiple second reconstructed pixel values; and
    for one of the multiple blocks, utilizing the corresponding multiple first reconstructed pixel values and the corresponding multiple second reconstructed pixel values to act as the multiple reference pixels, to perform intra-frame prediction upon said one of the multiple blocks, to generate a group of prediction data.

17. The signal processing method of claim 11, wherein utilizing the multiple partition modes that are different from the specific partition mode to partition the super block into the multiple blocks, respectively, to generate the plurality of groups of prediction data, and determining the best partition mode according to the plurality of groups of prediction data comprises:

comparing residual data of the multiple partition modes, to determine the best partition mode.

\* \* \* \* \*